United States Patent [19]
Maugars

[11] Patent Number: 5,912,618
[45] Date of Patent: Jun. 15, 1999

[54] SYSTEM FOR DETECTING THE PRESENCE OF AN ELECTRICALLY CONDUCTIVE OBJECT, PARTICULARLY AN INTEGRATED CIRCUIT ON A CHIP CARD

[75] Inventor: Philippe Maugars, Ranes, France

[73] Assignee: U.S. Philips Corporation, New York, N.Y.

[21] Appl. No.: 08/767,735

[22] Filed: Dec. 16, 1996

[30] Foreign Application Priority Data

Dec. 20, 1995 [FR] France .................................. 95 15178

[51] Int. Cl.⁶ ................................................ G08B 23/00
[52] U.S. Cl. ........................ 340/520; 340/506; 340/510; 340/511; 307/11
[58] Field of Search ............................. 340/520, 506, 340/510, 511, 517, 521; 307/11

[56] References Cited

U.S. PATENT DOCUMENTS 4,879,476  11/1989  Schweizer ............................... 307/10.1
5,210,525  5/1993  Lennon et al. .......................... 340/604

FOREIGN PATENT DOCUMENTS

WO9522475  8/1995  WIPO .............................. B60R 49/00

OTHER PUBLICATIONS

IBM Technical Disclosure Bulletin vol. 22, No. 10, Mar. 1980, pp. 4615–4616.

*Primary Examiner*—Jeffery A. Hofsass
*Assistant Examiner*—Daryl C. Pope

[57] ABSTRACT

The invention provides a system for detecting the presence of an electrically conductive object, the system comprising a first and a second contact (C1 and C2) intended to be short-circuited by said object, and further comprising a control device for the electric potentials of the contacts. In accordance with the invention the control device comprises means for applying a given potential (Vref), referred to as the reference potential, to the second contact (C2) at a high impedance (Z) with respect to the resistance generated by the contact with the conductive object to be detected, and for supplying a signal (CP) indicating that the potential of the second contact (C2) is near the reference potential (Vref).

6 Claims, 3 Drawing Sheets

SYSTEM FOR DETECTING THE PRESENCE OF AN ELECTRICALLY CONDUCTIVE OBJECT, PARTICULARLY AN INTEGRATED CIRCUIT ON A CHIP CARD

BACKGROUND OF THE INVENTION

The present invention relates to a system for detecting the presence of an electrically conductive object, the system comprising a first and a second contact intended to be short-circuited by said object, and further comprising a control device for the electric potentials of the contacts.

Such a system is described in the article "Automatic Module Detection" by mr. S. Meguro, published in the IBM Technical Disclosure Bulletin, Vol. 22, No. 10 of March 1980. This system makes it possible to detect the presence of a module in its receptacle, the module having two contacts which serve for short-circuiting two terminals in the receptacle, one coupled to logic 1 level at a high impedance and to a control logic, and the other one coupled to logic 0 level, to signal the presence of the module in its receptacle to the control logic when the two terminals are short-circuited by the contacts of the module.

Such a device is not suitable for detecting the presence of a chip card in its reader. As a matter of fact, the number of contacts on an object of this type is limited and it is not desirable to use two of these contacts exclusively for detection purposes. It is more advantageous to use one of the contacts which serve for the power supply of the integrated circuit on the card, preferably its positive supply terminal. However, the potential applied to this terminal is not constant in time. In fact, insertion of the card while the supply voltage is not zero could damage the integrated circuit. Therefore, care must be taken that the potential of those contacts of the detection system which serve for the power supply of the integrated circuit is zero in an initial stage. When the card is inserted correctly into its receptacle its presence is detected and the supply voltage should not be applied to the positive supply terminal of the integrated circuit until after this, to start the actual operating stage. The detection system should therefore be capable of operating on two different supply potentials.

SUMMARY OF THE INVENTION

It is an object of the invention to meet these requirements by providing a presence detection system capable of controlling and interpreting signals which can assume different states.

To this end, a detection system in accordance with the present invention is characterized in that the control device comprises means for applying a given potential, referred to as the reference potential, to the second contact at a high impedance with respect to the resistance generated by the contact with the conductive object to be detected, and for supplying a signal indicating that the potential of the second contact is near the reference potential.

An embodiment of the invention provides a detection system as defined in the opening paragraph, which is characterized in that the control device comprises at least our resistive elements arranged in series between a negative supply terminal and a positive supply terminal, which resistive elements have three intermediate nodes between their ends, which nodes, going from the negative supply terminal to the positive supply terminal are referred to as the first, the second and the third intermediate node, the control device further comprises a supply module, which generates a voltage which can assume either a value near the potential of the negative supply terminal or a value near the potential on the positive supply terminal, and the first contact is connected to the output of the supply module, while the potential of the second intermediate node is applied to the second contact at a high impedance with respect to the resistance generated by the contact with the conductive object to be detected, and the control device comprises means for effecting the comparison between the potential of the second contact and that of the first intermediate node, on the one hand, and the potential of the second contact and that of the third intermediate node, on the other hand.

Such a system allows the presence of a chip card in its reader to be detected while it controls the electrical power supply of the integrated circuit present on the card. In an initial stage the system applies zero voltage to the positive supply terminal of the integrated circuit. This initial stage lasts until the actual detection of the insertion of the card by identification of the zero voltage applied to the second contact as a result of the shortcircuit circuit between the two contacts by means of the positive supply terminal of the integrated circuit on the card. During the operating stage the system supplies a supply voltage close to that of the detection system to said positive supply terminal. Thus, it can detect a withdrawal of the card during this stage of normal operation by signalling a potential drop on that contact of the detection system which is not coupled to the supply module.

In a special embodiment of the invention such a detection system is characterized in that the second intermediate node is coupled to the second contact by means of an operational follower amplifier arranged in series with a resistive element having a high resistance.

A particularly advantageous embodiment of the invention provides a detection system which is characterized in that the comparison means incorporated in the control device comprise a first and a second operational comparator amplifier, of which the first one has its inverting terminal coupled to the second contact, its non-inverting terminal coupled to the first intermediate node, and its output coupled to one input of a two-input EXCLUSIVE-NOR logic gate, the second operational comparator amplifier having its inverting terminal coupled to the second contact, its non-inverting terminal coupled to the third intermediate node, and its output coupled to the other input of said EXCLUSIVE-NOR logic gate.

In order to preclude damaging of the integrated circuit by a sudden variation of the voltage applied to its positive supply terminal, it is advisable to ensure that it increases gradually. However, this gradual increase may disturb the results of the comparisons of the potentials on the intermediate nodes with the potential on the second contact and thus erroneously signal a withdrawal of the card. A variant of the invention aims at mitigating this problem by proposing a detection system which is characterized in that the supply module incorporated in the control device generates a voltage which, during a transitional mode, changes gradually from a potential near that of the negative supply terminal to a potential near that of the positive supply terminal and which subsequently keeps this potential during a permanent mode, and the control device comprises a masking device enabling the control device to ignore the comparisons between the potentials of the intermediate nodes and the potential of the second contact during the transitional mode.

A preferred embodiment of this variant of the invention provides a detection system which is characterized in that the masking device comprises a monostable multivibrator whose output is at the logic 1 level for a predetermined time corresponding to the length of the transitional mode and at the logic 0 level during the permanent mode, which monostable has its output connected to an input of a two-input logic OR gate, the output of the comparison means being connected to the other input of said logic OR gate.

BRIEF DESCRIPTION OF THE DRAWINGS

The invention will be more fully understood with the aid of the following description of some embodiments, given by way of non-limitative examples, with reference to the accompanying drawings, in which.

DETAILED DESCRIPTION OF THE PREFERRED EMBODIMENTS

Figure 1:
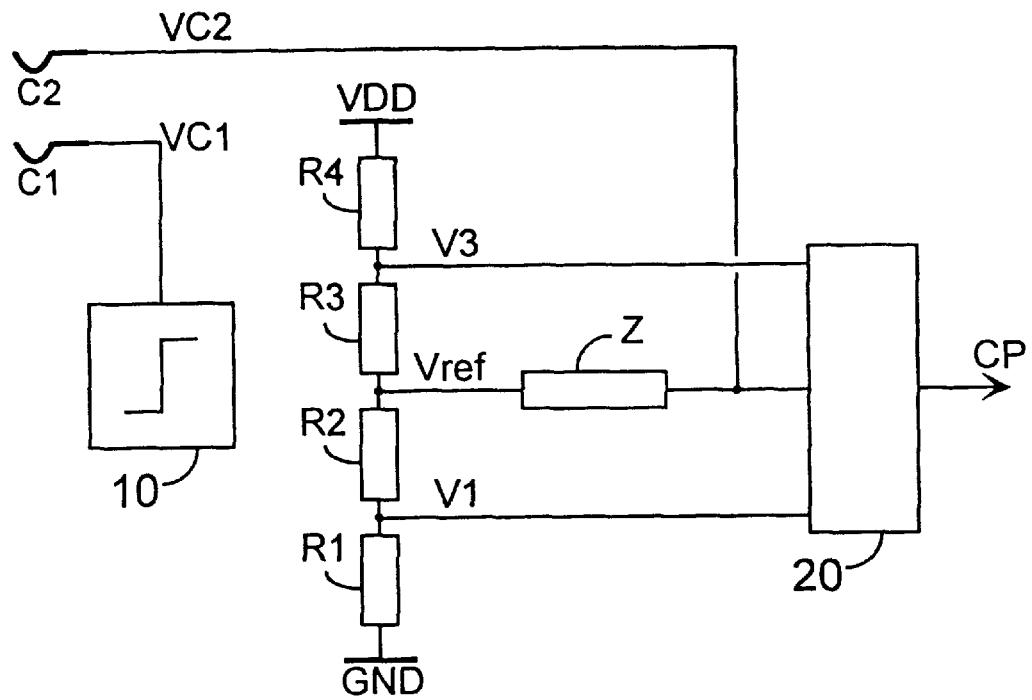
FIG. 1 is a functional diagram showing a part of a detection system in accordance with the invention.

FIG. 1 shows a part of a system for detecting the presence of an electrically conductive object, in the present case the positive supply terminal of an integrated circuit on a chip card. This system comprises a first contact C1 and a second contact C2, intended to be short-circuited by said object. Moreover, it comprises a device for controlling the electric potentials of the contacts. This device comprises at least four resistive elements R1, R2, R3, R4 arranged in series with a negative supply terminal GND and a positive supply terminal VDD, which resistive elements have three intermediate nodes between their ends, which going from the negative supply terminal to the positive supply terminal are referred to as the first, the second and the third intermediate node. This control device further comprises a supply module 10, which generates a voltage VC1 which can assume either a value near the potential of the negative supply terminal GND or a value near the potential on the positive supply terminal VDD. The first contact C1 is connected to the output of the supply module 10, while the potential of the second intermediate node, referenced Vref, is applied to the second contact C2 at a high impedance Z with respect to the resistance generated by the contact with the conductive object to be detected. Finally, the control device comprises means 20 for effecting the comparison between the potential of the second contact, referenced VC2, and that of the first intermediate node, referenced V1, on the one hand, and the potential VC2 of the second contact and that of the third intermediate node, referenced V3, on the other hand. When the output CP of said comparison means is at the logic 1 level, this indicates the presence of the object to be detected.

Figure 2:
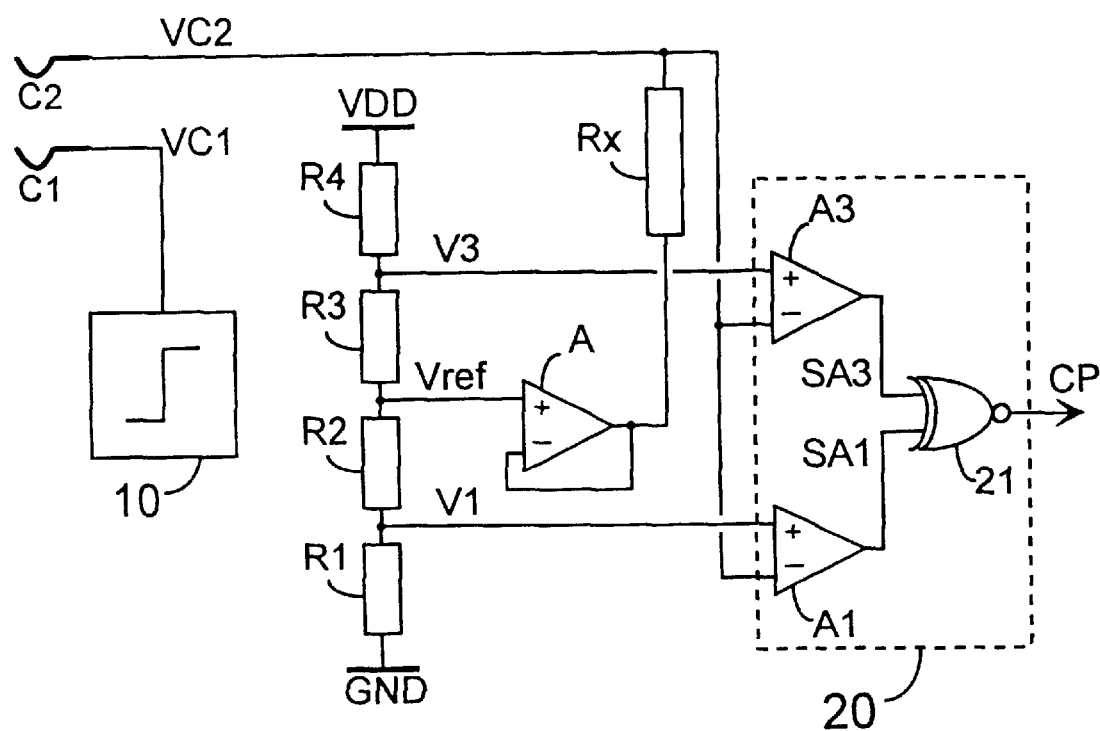
FIG. 2 is a functional diagram showing a part of a detection system in accordance with an advantageous embodiment of the invention.

FIG. 2 shows a part of a detection system in accordance with an advantageous embodiment of the invention, in which the second intermediate node is coupled to the second contact C2 by means of an operational follower amplifier A, arranged in series with a resistive element Rx having a high resistance. Moreover, the comparison means 20 incorporated in the control device comprise a first and a second operational comparator amplifier, of which the first one A1 has its inverting terminal coupled to the second contact C2, has its non-inverting terminal coupled to the first intermediate node, and has its output SA1 coupled to one input of a two-input EXCLUSIVE-NOR logic gate 21, the second operational comparator amplifier, referenced A3, having its inverting terminal coupled to the second contact C2, having its non-inverting terminal coupled to the third intermediate node, and having its output SA3 coupled to the other input of said EXCLUSIVE-NOR logic gate 21.

Figure 3:
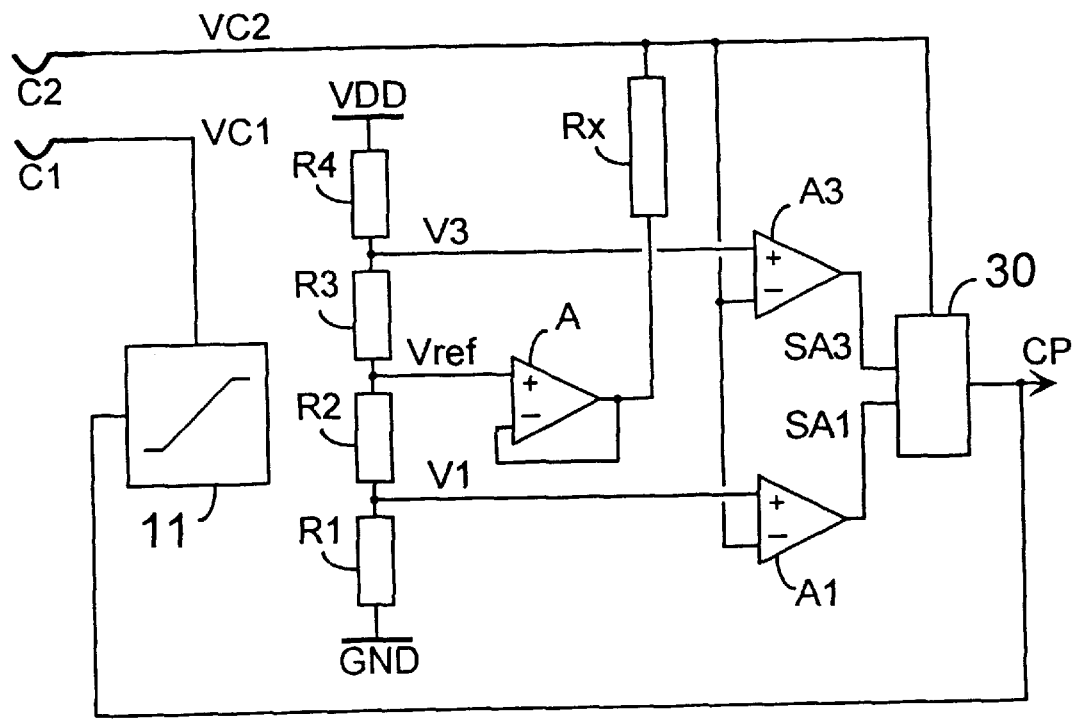
FIG. 3 is a functional diagram showing a part of a detection system in accordance with a variant of the invention.
Figure 4:
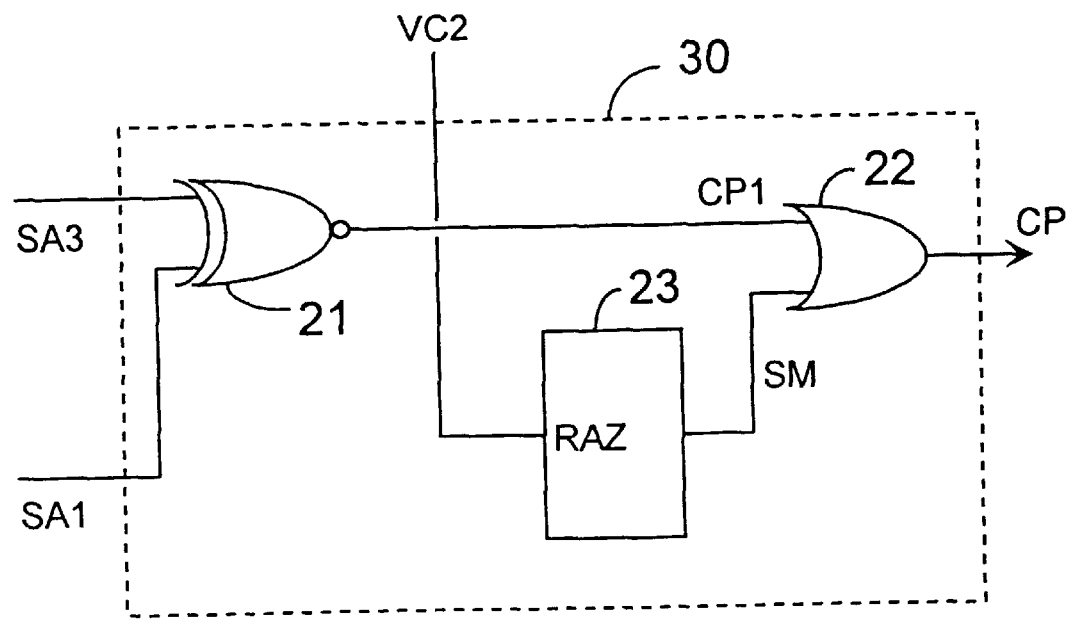
FIG. 4 is a functional diagram showing a part of a masking device incorporated in a preferred embodiment of a detection system in accordance with a variant of the invention.
Figure 5A:
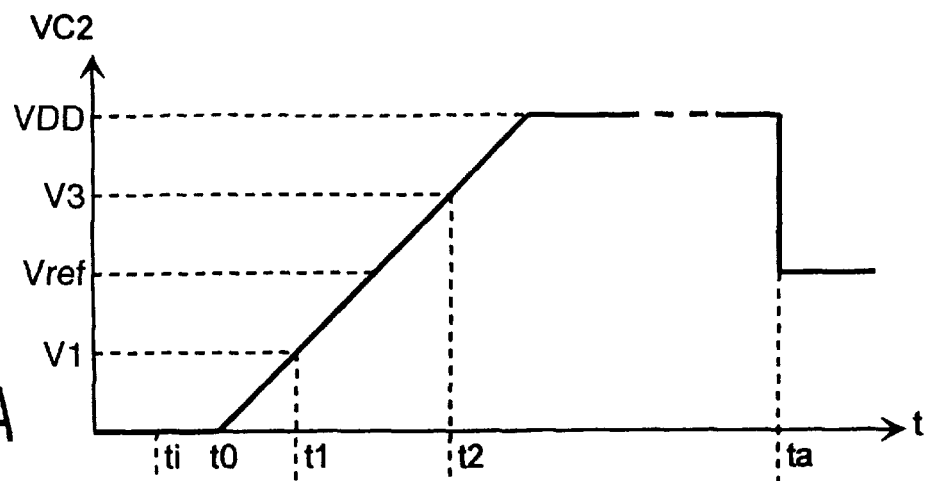
FIG. 5 shows a set of timing diagrams showing signals appearing in a detection system in accordance with this last-mentioned variant of the invention as a function of time.
Figure 5B:
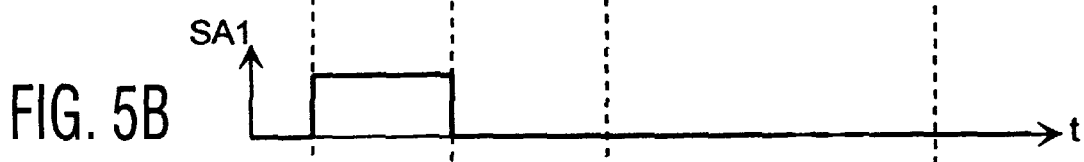
Figure 5C:
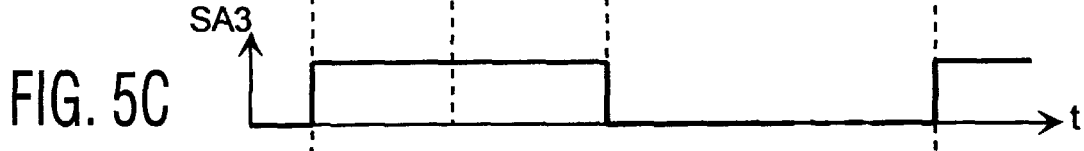
Figure 5D:
Figure 5E:
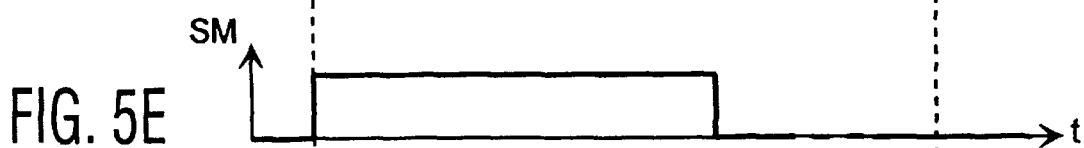
Figure 5F:
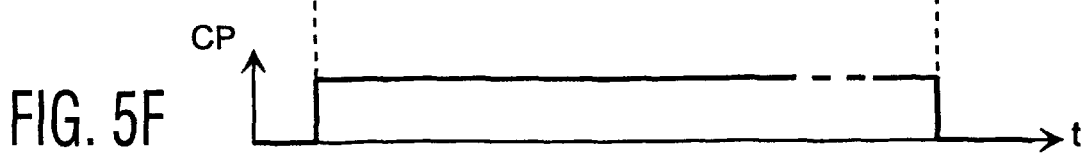

FIG. 3 shows a part of a variant of a detection system in accordance with the invention, in which a supply module 11 incorporated in the control device generates a voltage VC1 which, in a transitional mode, changes gradually from a potential near that of the negative supply terminal GND to a potential near that of the positive supply terminal VDD and which subsequently keeps this potential during a permanent mode. The control device further comprises a masking device 30 enabling the control device to ignore the comparisons between the potentials V1 and V3 of the intermediate nodes and the potential VC2 of the second contact during the transitional mode. FIG. 4 shows a part of a masking device incorporated in a preferred embodiment of a detection system in accordance with this variant of the invention, in which the masking device 30 comprises a monostable multivibrator 23 whose output SM is at the logic 1 level for a predetermined time corresponding to the length of the transitional mode and at the logic 0 level during the permanent mode, which monostable has its output connected to an input of a two-input logic OR gate 22, the output of the comparison means CP1 being connected to the other input of said logic OR gate 22. FIG. 5 shows the variation of the signals VC2, SA1, SA3, CP1, SM and CP as a function of time.

In the initial stage, i.e. before the detection of a conductive object between the two contacts C1 and C2, the supply module supplies a voltage VC1 of zero volts to the contact C1. Since the contact C2 is floating its potential is imposed on Vref. This potential is smaller than V3 but greater than V1. The output SA1 of the comparator A1 is consequently at the logic 0 level, while the output SA3 of the comparator A3 is at the logic 1 level. As a result, the output CP1 of the EXCLUSIVE NOR gate 21 is at the logic 0 level. Since the output of the monostable 23 is at the logic 0 level at the beginning of the initial stage, the output CP of the OR gate 22 is consequently at the logic 0 level.

At the instant ti an electrically conductive object, in the present case the positive supply terminal of an integrated circuit accommodated on a chip card, short-circuits the contacts C1 and C2. The zero voltage VC1 is then applied to the contact C2, the impedance separating the contact C2 from the potential Vref being high with respect to the resistance generated by the contact with the conductive object. This potential is both smaller than V3 and V1. The outputs SA1 and SA3 of the comparators A1 and A3 are therefore both at the same logic 1 level. The output CP1 of the EXCLUSIVE NOR gate 21 is consequently at the logic 1 level. As a result, the output CP of the OR gate 22 goes to the logic 1 level, thus signalling the presence of the chip card in its receptacle. This information is transmitted to the supply module 11, which can then proceed to the transitional mode and gradually raise the voltage VC1 to VDD. At the same time, the change to the logic 0 level has reset the monostable to zero, which monostable will produce an output signal SM of logic 1 level for the entire duration of this gradual rise. By pulling the output CP of the logic OR gate 22 to the logic 1 level, this allows the comparisons between the potentials V1 and V3 of the intermediate nodes and the potential VC2 of the second contact to be blocked during the transitional mode. As a matter of fact, starting from t0, the voltage VC2 increases with time, as can be seen in FIG. 5. At the instant t1, when VC2 exceeds V1, the output SA1 of the comparator A1 changes to the logic 0 level, while the output SA3 of the comparator A3 remains at the logic 1 level. The output CP1 of the EXCLUSIVE NOR gate 21 consequently goes to the logic 0 level. If the masking device were absent, this would erroneously indicate a withdrawal of the chip card from its receptacle. However, since the monostable 23 is at the logic 1 level during the entire transitional mode, the output CP of the OR gate 22 is kept at the logic 1 level. At the instant t2, when VC2 exceeds V3, the output SA3 of the comparator A3 changes to the logic 0 level, while the output SA1 of the comparator A1 remains at the logic 0 level. The output CP1 of the EXCLUSIVE NOR gate 21 consequently changes over to the logic 1 level. The permanent mode is obtained when VC2 has reached the potential VDD and when the output of the monostable 23 has returned to the logic 0 level, without the logic level of the signal CP being influenced, which is held at the 1 level by the output CP1 of the EXCLUSIVE NOR gate 21. At the instant ta, the chip card is withdrawn from its receptacle. The short-circuit between the contacts C1 and C2 is interrupted and the potential Vref is applied to the contact C2. The output SA3 of the comparator A3 changes to the logic 1 level, while the output SA1 of the comparator A1 remains at the logic level. The output CP1 of the EXCLUSIVE NOR gate 21 then again assumes the logic 0 level. The output signal CP of the OR gate 22 consequently also assumes the logic 0 level, thus signalling the withdrawal of the card.

It is to be noted that if the wiring of the inverting and the non-inverting inputs of the operational comparator amplifiers A1 and A3 had been reversed, merely the output signals SA1 and SA3 would have been inverted, while the output of the EXCLUSIVE NOR gate 21 would remain unchanged and, therefore, the operation of the control device would remain wholly identical.

Although the case described hereinbefore with reference to the Figures relates in particular to the detection of the presence of a chip card in its receptacle, it is obvious that this can readily be adapted to the detection of any other electrically conductive object.

I claim:

1. A system for detecting the presence of an electrically conductive object, the system comprising a first and a second contact intended to be short-circuited by said object, and further comprising a control device for the electric potentials of the contacts, characterized in that the control device comprises at least four resistive elements arranged in series between a negative supply terminal and a positive supply terminal, which resistive elements have three intermediate nodes between their ends, which nodes, going from the negative supply terminal to the positive supply terminal are referred to as the first, the second and the third intermediate node, the control device further comprises a supply module, which generates a voltage which can assume either a value near the potential of the negative supply terminal or a value near the potential on the positive supply terminal, and the first contact is connected to the output of the supply module, while the potential of the second intermediate node is applied to the second contact at a high impedance with respect to the resistance generated by the contact with the conductive object to be detected, and the control device comprises means for effecting the comparison between the potential of the second contact and that of the first intermediate node, in a first instance, and the potential of the second contact and that of the third intermediate node, in a second instance.

2. A detection system as claimed in claim 1, characterized in that the second intermediate node is coupled to the second contact by means of an operational follower amplifier arranged in series with a resistive element having a high resistance.

3. A detection system as claimed in claim 1, characterized in that the comparison means incorporated in the control device comprise a first and a second operational comparator amplifier, of which the first one has its inverting terminal coupled to the second contact, its non-inverting terminal coupled to the first intermediate node, and its output coupled to one input of a two-input EXCLUSIVE-NOR logic gate, the second operational comparator amplifier having its inverting terminal coupled to the second contact, its non-inverting terminal coupled to the third intermediate node, and its output coupled to the other input of said EXCLUSIVE-NOR logic gate.

4. A detection system as claimed in any one of claim 1, characterized in that the supply module incorporated in the control device generates a voltage which, during a transitional mode, changes gradually from a potential near that of the negative supply terminal to a potential near that of the positive supply terminal and which subsequently keeps this potential during a permanent mode, and the control device comprises a masking device enabling the control device to ignore the comparisons between the potentials of the intermediate nodes and the potential of the second contact during the transitional mode.

5. A detection system as claimed in claim 4, characterized in that the masking device comprises a monostable multivibrator whose output is at the logic 1 level for a predetermined time corresponding to the length of the transitional mode and at the logic 0 level during the permanent mode, which monostable has its output connected to an input of a two-input logic OR gate, the output of the comparison means being connected to the other input of said logic OR gate.

6. A system for detecting the presence of an electrically conductive object, which system comprises a first and a second contact intended to be closed by said object, an adjustable power source coupled to the first contact, a reference voltage source for generating a reference voltage coupled to the second contact via a high impedance circuit and further to a window comparator means, window voltage generation means for generating a first window comparison voltage below said reference voltage and a second window comparison voltage above said reference voltage, the window comparison means providing a signal indicating that the potential of the second contact is near the reference potential in absence of the electrically conductive object, and providing a signal that the potential of the second contact is near an output voltage of the adjustable power source outside a window formed by the first and second window comparison voltages when the electrically conductive object, which generates a substantially lower impedance across the first and second contacts than the high impedance circuit, is connected to the first and second contacts.

* * * * *